United States Patent [19]

Maholland et al.

[11] Patent Number: 5,021,377

[45] Date of Patent: * Jun. 4, 1991

[54] DEMETALLIZATION AND PASSIVATION OF SPENT CRACKING CATALYSTS

[75] Inventors: Michael K. Maholland; Chia-Min Fu, both of Bartlesville; Richard E. Lowery, Tulsa; Donald H. Kubicek; Brent J. Bertus, both of Bartlesville, all of Okla.

[73] Assignee: Phillips Petroleum Company, Bartlesville, Okla.

[*] Notice: The portion of the term of this patent subsequent to Jun. 19, 2007 has been disclaimed.

[21] Appl. No.: 533,623

[22] Filed: Jun. 5, 1990

[51] Int. Cl.$^5$ .................. B01J 29/38; B01J 38/66; B01J 38/54; C10G 11/05

[52] U.S. Cl. .................. 502/26; 208/52 CT; 208/111; 208/120; 502/27; 502/32; 502/35; 502/36; 502/516; 502/521

[58] Field of Search .................. 502/22, 25, 32, 34, 502/36, 37, 516, 26, 521

[56] References Cited

U.S. PATENT DOCUMENTS

| | | | |
|---|---|---|---|
| 3,711,422 | 1/1973 | Johnson et al. | 252/414 |
| 4,686,197 | 8/1987 | Elvin | 502/22 |
| 4,787,968 | 11/1988 | Elvin | 502/32 |
| 4,794,095 | 12/1988 | Walker et al. | 502/64 |
| 4,800,185 | 1/1989 | Elvin et al. | 502/26 |
| 4,814,066 | 3/1989 | Fu | 208/120 |
| 4,824,814 | 4/1989 | Elvin et al. | 502/22 |
| 4,935,121 | 6/1990 | Fu et al. | 208/120 |

Primary Examiner—Paul E. Konopka
Attorney, Agent, or Firm—K. K. Brandes

[57] ABSTRACT

A process for reactivating a spent, metal-contaminated zeolite-containing catalytic cracking catalyst composition comprises partially demetallizing (preferably by chlorinating and washing) the spent catalytic cracking catalyst composition, and thereafter contacting it with at least one fluorine compound (preferably $NH_4F$) and at least one antimony compound. The thus reactivated catalytic cracking catalyst composition is employed in a catalytic cracking process.

16 Claims, No Drawings

DEMETALLIZATION AND PASSIVATION OF SPENT CRACKING CATALYSTS

This invention relates to a method of reactivating spent, metal-contaminated zeolite-containing catalytic cracking catalysts. In another aspect, this invention relates to a reactivated catalytic cracking catalyst. In still another aspect, this invention relates to a catalytic cracking process employing a reactivated spent, metal-contaminated cracking catalyst.

Methods of rejuvenating deactivated zeolite-containing catalytic cracking catalysts by treatment with fluorine compounds are known and have been disclosed in the patent literature, e.g., in U.S. Pat. No. 4,814,066. Also, the use of antimony-containing passivating agents for alleviating the detrimental effects of metal contaminants on cracking catalysts has been described in the patent literature, e.g., in U.S. Pat. No. 3,711,422. Furthermore, it is known to rejuvenate spent, metal-contaminated cracking catalysts by a demetallization process comprising a chlorinating step, as has been described in U.S. Pat. No. 4,686,197. However, there is an ever present need to develop new, more effective catalyst reactivation and metals passivation processes.

SUMMARY OF THE INVENTION

It is an object of this invention to provide a process for treating a spent, metal-contaminated zeolite-containing catalytic cracking catalyst composition, under such conditions as to enhance its catalytic cracking activity and to reduce its capability of generating hydrogen during catalytic cracking. It is another object of this invention to provide a reactivated spent catalytic catalyst composition. It is still another object of this invention to provide a catalytic cracking process employing a reactivated spent catalytic cracking catalyst composition. It is a particular object of this invention to provide an improvement of the process described in U.S. Pat. application Ser. No. 07/370,670, filed June 22, 1989, now U.S. Pat. No. 4,935,121 the entire disclosure of which is herein incorporated by reference. Other objects and advantages will become apparent from the detailed description of the invention and the appended claims.

According to this invention, in a process for reactivating a spent zeolite-containing catalytic cracking catalyst composition, which contains at least one metal contaminant and at least a portion of which has previously been used in a catalytic cracking process (and has thereby lost some of its initial catalytic cracking activity, i.e., its cracking activity before its use in the catalytic cracking process), wherein this process comprises contacting the spent catalyst composition with (a) at least one fluorine compound selected from the group consisting of $NH_4F$, $NH_4HF_2$ and $HF$ and (b) at least one metals passivating agent selected from the group consisting of antimony compounds, under such contacting conditions as to result in reduced hydrogen generation caused by at least one metal contaminant contained in the spent cracking catalyst composition during catalytic cracking (as measured by hydrogen generation in a test for catalytically cracking a heavy hydrocarbon-containing oil, carried out substantially in accordance with the procedure of Example II of U.S. Pat. No. 4,794,095); the improvement comprises employing a partially demetallized spent cracking catalyst composition in said contacting with agents (a) and (b). Preferably, treating agent (a) is ammonium fluoride, more preferably dissolved in water.

In a preferred embodiment, the partially demetallized spent cracking catalyst composition employed in the process of this invention is a regenerated, substantially coke-free, metal-contaminated cracking catalyst composition which has been subjected to treatment with at least one chlorine-containing substance at an elevated temperature so as to obtain a chlorinated catalyst composition, followed by cooling the chlorinated catalyst composition, and washing the cooled, chlorinated catalyst composition with at least one aqueous liquid so as to produce a catalyst composition having a reduced content of metal contaminants (substantially in accordance with the demetallizing procedure described in U.S. Pat. No. 4,686,197).

In another preferred embodiment, the substantially coke-free, regenerated, metal-contaminated cracking catalyst has been treated with a molecular oxygen-containing gas at an elevated temperature (substantially in accordance with the procedure described in column 7, lines 30-68 of U.S. Pat. No. 4,686,197), prior to the above-described chlorinating treatment.

In still another embodiment, the substantially coke-free, metalcontaminated catalyst composition has been contacted with a sulfur-containing agent so as to form a sulfided catalyst composition (substantially in accordance with the procedure described in column 8 of U.S. Pat. No. 4,686,197), prior to the above-described chlorinating treatment and, preferably, after the above-described treatment with a molecular oxygen-containing gas.

Also in accordance with this invention, there is provided a reactivated spent zeolite-containing catalytic cracking catalyst composition having been treated by the reactivation process of this invention, described above.

Further in accordance with this invention, a catalytic cracking process is provided comprising the step of contacting a hydrocarbon-containing feed stream with a zeolite-containing catalytic cracking catalyst composition, under such cracking conditions as to obtain at least one normally liquid (i.e., liquid at 25° C. and 1 atm.) hydrocarbon-containing product stream having a lower initial boiling point and higher API gravity (measured at 60° F.) than said hydrocarbon-containing feed stream, wherein at least a portion of said zeolite-containing catalytic cracking catalyst composition is a reactivated catalytic cracking composition having been treated by the reactivation process of this invention.

DETAILED DESCRIPTION OF THE INVENTION

The term "catalytic cracking process", as used herein, implies that essentially no hydrocracking occurs and that the catalytic cracking process is carried out with a hydrocarbon-containing oil, substantially in the absence of added hydrogen gas. The term "cracking catalyst" as used herein encompasses only catalytic cracking catalysts, i.e., those which are employed in catalytic cracking processes in the substantial absence of added hydrogen gas. The term "spent", as used herein, implies that at least a portion of the zeolite-containing catalyst composition has previously been used in a process for catalytically cracking hydrocarbon-containing oils which contain metal (Ni, V, Cu) impurities, and has then been regenerated by stripping of adhered oil from the metal-contaminated composition catalyst (such as by steam-stripping) and subsequent heating in an oxidizing gas atmosphere (such as air) so as to substantially burn off coke deposits on the catalyst composition. The term "reactivating", as used herein, implies that the extent of hydrogen generation (during catalytic cracking) caused by metal contaminant deposits on a spent cracking catalyst is reduced. Additional benefits (such as higher feed conversion, higher gasoline yield) may also be attained by the reactivating treatment of the spent catalyst.

Any partially demetallized spent zeolite-containing catalyst composition, which still contains at least one metal contaminant, can be used as the starting material in the reactivation process of this invention. The partially demetallized spent catalyst composition can contain any portion of such regenerated catalyst composition, ranging from 100 percent to about 10 weight-% (i.e., containing 0% to about 90 weight-% fresh, unused zeolite-containing cracking catalyst composition). The term "spent catalyst composition", as used herein, encompasses equilibrium cracking catalysts, which are commonly employed in commercial catalytic cracking operations, and generally comprises a physical blend of regenerated spent catalyst composition and fresh (unused) cracking catalyst composition. An equilibrium catalyst generally comprises a mixture of catalyst particles of various ages, i.e., a portion of the equilibrium catalyst particles has passed through a varying number of cracking and regeneration cycles, while a smaller portion of the equilibrium catalyst particles is fresh (unused) cracking catalyst composition.

The zeolite component of the spent zeolite-containing cracking composition of this invention can be any natural or synthetic crystalline aluminosilicate zeolite which exhibits cracking activity. Non-limiting examples of such zeolites are faujastie, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia silicates, ferrosilicates, borosilicates, and the like, as disclosed in U.S. Pat. No. 4,556,749.

Generally, the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the spent zeolite/matrix cracking catalyst composition used in step (a) is in the range of from about 100 to about 800 $m^2/g$. Generally, the weight ratio of zeolite to matrix material in the spent cracking catalyst composition is in the range of from about 1:20 to about 1:1.

The partially demetallized spent zeolite-containing catalytic cracking catalyst composition employed in the process of the invention still contains metal compounds as contaminants (generally as oxides), such as compounds of Ni, V, Fe, and Cu, and the like. Contaminants of each metal can be present in amounts ranging from traces (about 0.01 weight-%) to about 2.0 weight-% of contaminant of each metal, expressed as metal oxide. These metal impurities in the spent catalytic cracking catalyst compositions have generally been absorbed from the oil feed in a previous catalytic cracking process.

Any process for converting the spent, metal-contaminated catalytic cracking catalyst composition to a partially demetallized spent catalytic cracking composition can be employed. Particularly preferred is a demetallization process which has been described in U.S. Pat. No. 4,686,197, the entire disclosure of which is herein incorporated by reference. This preferred demetallization process requires a chlorinating step.

The chlorinating step, preferably vapor phase chlorination, is carried out at moderately elevated temperatures of about 300° F. to about 1000° F. (preferably about 550°-650° F.) wherein the catalyst composition and structure is not materially harmed by the treatment. The chlorinating treatment converts a substantial portion, preferably at least about 30 percent and more preferably at least about 50 percent, of the poisoning metals content in the spent catalyst to chlorides. The chlorination, even when conducted in the lower temperature ranges, e.g., below about 550° F., preferably serves simultaneously to remove, by volatilization, vanadium chlorides (such as vanadium oxychloride and/or vanadium tetrachloride) and/or iron chloride formed by chlorination. When volatilization of these compounds is not performed or not completed during chlorination, the chlorination may be followed by a purge with an inert gas such as nitrogen or flue gas in these higher temperature ranges, that is, about 550 degrees F. to about 1000 degrees F. for volatilization of these compounds. As has been pointed out in U.S. Pat. No. 4,686,197, column 6, the chlorinating agent is preferably substantially anhydrous. A pressure of about 0 to about 100 or more psig, preferably about 0 to about 15 psig, can be maintained during chlorination, the contacting usually lasting for at least about five minutes, preferably about 15 minutes to about 2 hours.

The chlorinating agent can be a vaporizable covalent compound of chlorine with carbon or sulfur. The carbon compounds of chlorine which can be employed are generally the chlorine-substituted light hydrocarbons which may be introduced to the chlorination reactor as such or can be produced during the chlorination from a mixture of a chlorine gas with low molecular weight hydrocarbons, preferably carbon tetrachloride. Useful inorganic sulfur-containing compounds include volatizable sulfur chlorides, e.g., sulfur monochloride, ($S_2Cl_2$) sulfur dichloride ($SCl_2$), thionyl chloride ($SOCl_2$), and sulfuryl chloride ($SO_2Cl_2$). Preferably, the chlorinating agent contains a gaseous inert diluent which may advantageously be nitrogen or any other gas which is inert under the reaction conditions. The chlorinating gas may also comprise molecular chlorine, hydrogen chloride and mixtures thereof, particularly in combination with one or more of the covalent chlorinating agents described above (i.e., chlorides of sulfur or carbon).

If employed, the vaporizable covalent carbon or sulfur compounds of chlorine are generally used in the amount of about 0.5–50 percent, preferably 1–10 percent, based on the weight of the catalyst, for good metals removal from the catalyst. The amount of the agent may vary, however, depending upon the specific operation of the chlorination step, for example, a batch treatment may sometimes require more agent than a continuous treatment for the same degree of effectiveness and results. When molecular chlorine or HCl and/or inert diluents are employed as at least part of the chlorinating agent they are supplied in amounts recommended by U.S. Pat. No. 4,686,197, columns 6 and 7.

Prior to the above-described chlorination, the regenerated, substantially carbon-free spent catalyst composition is preferably heated with molecular oxygen-containing gas, substantially in accordance with the disclosure in column 7 of U.S. Pat. No. 4,686,197, to increase vanadium removal, preferably at temperatures above the temperature employed during the preceding catalyst regeneration (where coke is burned off) but below a temperature where the catalyst undergoes any substantial deleterious change in the physical or chemical characteristics. The catalyst is preferably in a substantially carbon-free condition during this high temperature oxidative treatment. This oxidative treatment of the essentially carbon-free catalyst is carried out at least long enough to provide a substantial amount of vanadium in its highest valence state.

The treatment of the catalyst with molecular oxygen-containing gas prior to the chlorination is preferably performed at a temperature of about 1000° F. to about 1800° F. The duration of this treatment with molecular oxygen is dependent, for example, upon the temperature, the amount of vanadium on the catalyst and the characteristics of the equipment used. Preferably, the length of this oxidative treatment is in the range of about 0.25 hour to about four hours. The gas may be free oxygen, or a mixture of oxygen with inert gas, such as air or oxygen-enriched air. The partial pressure of oxygen in the treating gas may range widely, for example, from about 0.1 to 30 atmospheres. It is preferred to carry out the oxygen treatment for at least about 15 or 30 minutes with a gas containing at least about 1 volume percent free oxygen, more preferably at least about 10 volume percent free oxygen.

Also, preferably, a sulfiding step is performed prior to the chlorinating step by contacting the metal poisoned catalyst, preferably after having been treated with an oxygen-containing gas (as described above), with elemental sulfur vapors or, more conveniently, by contacting the poisoned catalyst with a volatile sulfide, such as hydrogen sulfide, carbon disulfide or a mercaptan, substantially in accordance with the procedure described in column 8 of U.S. Pat. No. 4,686,197. The contact with the sulfur-containing vapor can be performed at an elevated temperature generally in the range of about 500° F. to about 1500° F., preferably about 800° F. to about 1300° F. Other preferred treating conditions comprise a sulfur-containing vapor partial pressure of about 0.1 to about 30 atmospheres, preferably about 0.5 to about 25 atmospheres. Hydrogen sulfide is a preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run, for instance, at least about 5 minutes up to about 20 hours, depending on the sulfiding conditions and the severity of the catalyst poisoning, preferably about 1–2 hours. The sulfiding step performs the function not only of providing a sulfur-containing metal compound which may be easily converted to chloride form, but also appears to concentrate some metal poisons, especially nickel, at the surface of the catalyst particle.

After the chlorination step described above, and after at least partial vaporization of vanadium chlorides, the chlorinated catalyst is cooled, as is disclosed in column 4 of U.S. Pat. No. 4,686,197. The cooling step after the chlorinating step may be performed in any suitable manner and in any suitable equipment. It is preferred that the chlorinated catalyst be kept substantially anhydrous during this cooling. In one embodiment, the cooling occurs by contacting the relatively hot chlorinated catalyst with a lower temperature gaseous composition, preferably a substantially inert gaseous compositions such as nitrogen, combustion flue gases, carbon dioxide, argon, other inert gases, and the like. In addition to providing for at least a portion of the cooling to the chlorinated catalyst, this gaseous composition contacting preferably acts to reduce the chlorine (or chloride) content of the chlorinated catalyst and/or reduces the content of at least one of the contaminant metals, in particular vanadium, from the chlorinated catalyst, e.g., by "sweeping" away volatile metal chlorides which are formed during catalyst chlorination.

The cooling may occur in a separate heat exchanger, e.g., conventional catalyst cooler, in which heat from the chlorinated catalyst is indirectly provided to a cooling medium, such as a liquid or gaseous medium. It is preferred that the hot chlorinated catalyst not contact any liquid medium prior to being cooled as described herein. The degree of cooling may vary widely, provided that such cooling provides a partially demetallized catalyst with improved hydrocarbon conversion catalytic activity. Preferably, this cooling reduces the temperature of the chlorinated catalyst by at least about 50° F. In one particular embodiment, the cooling reduces the temperature of the chlorinated catalyst to a temperature in the range of about 50° F. to about 250° F., more preferably about 60° F. to about 150° F.

Thereafter, the cooled chlorinated catalyst is washed with at least one liquid aqueous composition, preferably free of ammonium ions, so as to remove at least a portion of contaminant metal, e.g., nickel chlorides, substantially in accordance with the disclosure in column 8–11 of U.S. Pat. No. 4,686,197. The water used in this washing step is sometimes distilled or deionized prior to contact with the chlorinated catalyst. However, the aqueous medium can contain extraneous ingredients in trace amounts, so long as the medium is aqueous-based and the extraneous ingredients do not interfere with demetallization or adversely affect the properties of the catalyst. Temperature of about 150° F. to the boiling point of water are helpful in increasing the solubility of the metal chlorides. Temperatures above 212° F. and elevated pressures may be used, but the results do not seem to justify the added equipment. The aqueous liquid is preferably acidic. A weakly acid condition may be obtained by dissolution of the chlorides generally present in a chlorinated catalyst which has not been purged too severely.

The initial liquid aqueous composition may be a reductive wash medium. Preferably, the reductive wash is followed by an oxidative wash. These washes may be given alternately, or several reductive washes may be followed by several oxidative washes. Alternating washes leave the catalyst in the best form for hydrocarbon conversion, e.g., catalytic cracking. As used herein, "reductive" wash refers to a wash with an aqueous solution containing a reducing agent or an agent which can give up electrons. Similarly, "oxidative" wash refers to a wash with an aqueous solution containing an oxidizing agent or an agent which can accept electrons. Moreover, "wash" refers to a treatment with the solution which may be accomplished by contacting the catalyst with the wash solution for a time sufficient to cause an interaction between the solution and catalyst thereby removing at least a portion of the metal poison. The contacting may be a batch operation, a semi-continuous operation or a continuous operation. Thus, a "wash" may include merely stirring in a batch vessel or a complex series of countercurrent contacters or continuous contacters.

A preferred reductive wash medium comprises a solution of sulfur dioxide or compounds capable of producing sulfur dioxide such as sulfites and bisulfites in an acidic aqueous medium. Other reducing agents are listed in column 9 of U.S. Pat. No. 4,686,197. Reductive washes with sulfur dioxide are preferably performed in the substantial absence of oxygen. By way of example of a preferred reductive wash, an aqueous solution saturated with sulfur dioxide is prepared at about 0° C. to about 20° C., preferably about 5° C. to about 15° C., by bubbling $SO_2$ through water. An aqueous slurry containing about 10–40 percent, and preferably about 15–25 percent, by weight chlorinated catalyst in water is prepared and heated to a temperature of about 6020 C. to about 95° C., preferably about 65° C. to about 80° C. The $SO_2$-saturated solution is then added to the catalyst slurry in an amount sufficient to give an initial pH of the system in the range of about 2.0 to about 3.5, preferably about 2.5 to about 3.0. Preferably, about 0.1 to about 10 volumes of $SO_2$-saturated solution per volume of catalyst are used during this wash. After the contacting has occurred for about 0.5–10 minutes, preferably about 1–5 minutes, preferably under an inert atmosphere, the demetalized catalyst can be separated, e.g., by filtration or decanting. Long contact times are preferably avoided to minimize metals redisposition on the catalyst and to avoid oxidation of the $SO_2$ should the wash be effected in a manner where air and oxygen are not intentionally excluded. This reductive wash step can be followed by a water wash.

As indicated, the reductive wash is preferably followed by an oxidative wash. A preferred oxidative wash medium comprises a solution of hydrogen peroxide in water. Other oxidizing agents which may be used are listed in column 10 of U.S. Pat. No. 4,686, 197. The hydrogen peroxide solution preferably containing about 2 to 30 weight percent hydrogen peroxide, can be added to an aqueous catalyst slurry, similar to the one described above, at about 60° C. to about 95° C., preferably about 65° C. to about 85° C., and allowed to react for a time sufficient to solubilize at least a portion of the vanadium. Preferred wash times are about 1–5 minutes. A concentration of $H_2O_2$ in the range of about 5–50 (preferably about 10–20) lb. of $H_2O_2$/ton of catalyst is preferably employed. Additional oxidative washes can be used to ensure efficient removal of metal and the restoration of catalytic properties. In addition, the oxidative washing can be carried out either in the presence of or absence of a mineral acid such as HCl, $HNO_3$ or $H_2SO_4$. Preferably, the pH of the oxidative wash medium is about 2 to about 6. Alternating catalyst washing using reductive and oxidative solutions can be used. If alternative washes are used, it is preferred that the last wash be an oxidative wash. After the catalyst is washed, the catalyst slurry can be filtered to give a cake. The cake may be reslurried one or more time with water or rinsed in other ways, such as, for example, by a water wash of the filter cake.

The thus-washed, partially demetallized catalyst composition (optionally after having been dried) is then subjected to the treatment with (a) at least one fluorine compound and (b) at least one antimony compound, in accordance with the process of this invention. The partially demetallized, spent zeolite-containing cracking catalyst composition still contains metal compounds as contaminants (generally as oxides), such as compounds (particularly oxides) of Ni, V, Fe, and Cu, and the like. Contaminants of each metal can be present in amounts ranging from traces (about 0.01 weight-%) to about 2.0 weight-% of contaminant of each metal, expressed as metal oxide.

Fluorine compounds which can be employed as treating agent (a) in the reactivation process of this invention are $NH_4F$ (preferred), $NH_4F_2$, HF, and mixtures of two or more of these compounds. The fluorine compound a gas or a liquid. Preferably, the fluorine compound is dissolved in water. Also, it is presently preferred to have no $NH_4NO_3$ present in the $NH_4F$ solution. Preferably, there should be no treatment of the partially demetallized catalyst with $NH_4NO_3$ prior to the treatment with the fluorine and antimony compounds.

Any suitable metal passivating agent selected from the group consisting of antimony compounds can be used as treating agent (b) in the reactivation process of this invention. Preferred passivating agents include; antimony tris(0,0-dihydrocarbyl) phosphorodithioates, antimony oxides ($Sb_2O_3$, $Sb_2O_5$), antimony carboxylates, antimony mercaptides, and the like. The term "metals passivating", as used herein, implies that the detrimental effect of generating $H_2$ during catalytic cracking caused by metal deposits on a cracking catalyst composition has been mitigated.

The contacting of the partially demetallized, spent zeolite-containing cracking catalyst with the fluorine compounds(s) and the metal passivating agent(s) can be carried out in any suitable manner. Preferably, this contacting with the fluorine compounds(s) and the antimony compound(s) is performed substantially simultaneously. In one mode of operation, the partially demetallized spent cracking catalyst is contacted (either by impregnation or by spraying or the like) with a solution which contains both the fluorine compound(s) and the antimony compound(s). This mode is feasible fi the dissolved fluorine and antimony compounds do not form a precipitate. In another mode of operation, a first solution containing at least one fluorine compound and a second solution containing at least one antimony compound are prepared. Then the partially demetallized spent catalyst composition is contacted with the first solution and thereafter with the second solution (either by impregnation or by spraying). Or the partially demetallized spent catalyst is contacted with the second solution and thereafter with the first solution (either by impregnation or by spraying). Or the partially demetallized catalyst is simultaneously sprayed with the first solution and the second solution.

The contacting process can be carried out either as a batch process or as a continuous process. Any suitable time of contact of the partially demetallized spent cracking catalyst composition with the first and the second solutions can be employed, generally about 0.1 to about 10 hours. Any suitable temperature can be employed in this contacting process, generally about 10° to about 100° C. It is generally preferable to carry out some agitation (e.g., stirring or tumbling or falling of the partially demetallized spent catalyst particles) during the contacting step.

Any suitable solvent for the fluorine compound(s) and the antimony compound(s) can be employed, such as water, alcohols (such as methanol, ethanol, etc.) esters (such as ethyl acetate), ketones (such as acetone), liquid hydrocarbons (such as hexane, heptane, cyclohexane, benzene, toluene and the like). The choice of the solvent(s) will be determined by the chemical nature of fluorine compound(s) and of the antimony compound(s), and can easily be made by those having ordinary skill in the art.

Any suitable concentration of the fluorine compound(s) in a solution can be employed, preferably about 0.01 to about 2 mol/l (more preferably about 0.1-1 mol/l). Any suitable concentration of the antimony compound(s) in a liquid medium (preferably a solution) can be employed, preferably about 0.01-0.5 mol/l (more preferably about 0.1 to 0.3 mol/l). It is within the scope of this invention to use a colloidal dispersion of an antimony compound in a liquid medium (e.g., in water).

Any suitable weight ratio of the contacting solution(s) to the partially demetallized spent zeolite-containing cracking catalyst can be employed in the reactivation process of this invention. Generally, these weight ratios are selected such that the ratio of the number of millimoles of the fluorine compound(s) to the number of grams of the partially demetallized spent cracking catalyst composition is in the range of from about 0.01:1 to about 10:1 (preferably about 0.2:1 to about 1:1), and the ratio of the number of grams of the antimony compound(s) to the number of grams of partially demetallized spent catalyst composition is in the range of from about 0.001:1 to about 0.5:1 (preferably about 0.002:1 to about 0.2:1). Preferably, the concentration of the fluorine and antimony compounds in the solution(s) and the ratio of the solution(s) to the partially demetallized spent catalyst composition are chosen such that about 0.01 to about 2 (more preferably about 0.05-1) weight-% fluorine and about 0.01 to about 5 (more preferably about 0.02-2) weight-% antimony are incorporated into the partially demetallized spent cracking catalyst.

Preferably, the partially demetallized spent cracking catalyst is heated after the contacting with the fluorine compound(s) and the antimony compound(s). Any suitable heating conditions can be employed which are effective to substantially dry the spent catalyst which has been treated with the fluorine compound(s) and antimony compound(s), preferably first at a relatively low temperature (more preferably at about 80°–200° C.) for a time long enough (more preferably at about 0.5-10 hours) so as to substantially dry the treated spent catalyst, and then at a higher temperature (more preferably at about 300°–700° C., for about 0.5-10 hours), primarily for the purpose of decomposing the antimony compound(s) to oxides of antimony. The above heating steps can be carried out in an oxidizing gas, such as air, or in an inert gas atmosphere (e.g., in a stream of $N_2$ or Ar or He).

The reactivated catalyst composition which is obtained in the reactivation process of this invention can be used in any catalytic cracking process, i.e., a process for catalytically cracking hydrocarbon-containing oil feedstocks, in any suitable cracking reactor (e.g., in a FCC reactor or in a Thermofor moving bed reactor), essentially in the absence of added hydrogen gas. The reactivated catalyst composition can be used alone or in admixture with fresh (unused) zeolite-containing catalyst composition in catalytic cracking processes.

The hydrocarbon-containing feed stream for the catalytic cracking process of this invention can be any suitable feedstock. Generally the feed has an initial boiling point (ASTM D1160) in excess of about 400° F., preferably a boiling range of from about 400° to about 1200° F., more preferably a range of from about 500° to about 1100° F., measured at atmospheric pressure conditions. The API gravity (measured at 60° F.) generally is in the range of from about 5 to about 40, preferably from about 10 to about 35. Frequently these feedstocks contain Ramsbottom carbon residue (ASTM D524; generally about 0.1-20 weight-%), sulfur (generally about 0.1-5 weight-% S), nitrogen (generally about 0.05-2 weight-% N), nickel (generally about 0.05-30 ppm Ni, i.e., parts by weight of Ni per million parts of feed), vanadium (generally about 0.1-50 ppm V) and copper (generally about 0.01-30 ppm Cu). Non-limiting examples of suitable feedstocks are light gas oils, heavy gas oils, vacuum gas oils, cracker recycle oils (cycle oils), residua (such as distillation bottoms fractions), hydrotreated residua (e.g., hydrotreated in the presence of Ni, Co, Mo-promoted alumina catalysts), liquid coal pyrolyzates, liquid products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally, a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) ranges form about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of spent (i.e., used) cracking catalyst from gaseous and liquid cracked products and the separation of cracking products into various gaseous and liquid product fractions can be carried out by any conventional separation means. The most desirable product fraction is gasoline (ASTM boiling range: about 180°-400° F.). Non-limiting examples of such separation schemes are shown in "Petroleum Refining" by James H. Gary and Glenn E. Handwerk, Marcel Dekker, Inc., 1975.

The spent catalysts are regenerated, preferably by steam stripping for removal of adhered oil and subsequent heating under oxidizing regeneration conditions so as to burn off carbon deposits. At least a portion of the regenerated cracking catalyst composition can then be treated by the reactivation process of this invention and thereafter be recycled to the catalytic cracking reactor, generally in admixture with fresh (unused) cracking catalyst.

The following examples are present to further illustrate this invention and are not to be considered as unduly limiting the scope of this invention.

Example I

This example illustrates the reactivation of a partially demetallized spent zeolite-containing catalytic cracking catalyst, at least a portion of which had previously been employed in a catalytic cracking process and had then been oxidatively regenerated and subsequently demetallized substantially in accordance with the demetallization process described in U.S. Pat. No. 4,686,197. The partially demetallized spent cracking catalyst, labeled Catalyst A, was obtained from ChemCat Corporation, New Orleans, La., contained 1870 ppm Na (i.e., parts by weight of Na per million parts of catalyst), 1600 ppm Ni, 853 ppm V and 135 ppm Sb; and had a surface area of 123 m$^2$/g. The unit cell size of the zeolite portion (about 10 weight-%) of Catalyst A was 24.31 Angstroms.

Catalyst B (Control) was prepared by impregnating 50 grams of dry Catalyst A with 24 cc of a diluted aqueous Sb$_2$O$_5$ dispersion. This diluted aqueous dispersion had been obtained by mixing 1 gram of "Phil-Ad CA 600", an aqueous dispersion of Sb$_2$O$_5$ containing about 20 weight-% Sb (provided by Catalyst Resources, Inc., Pasadena, Tex.) with 96 grams of water. The thus-treated catalyst was dried for about 2 hours at 120° C. Catalyst B contained about 1000 ppm Sb (i.e., 1000 parts by weight of Sb per million parts by weight of catalyst.)

Catalyst C (Invention) was prepared by first impregnating 50 grams Catalyst A with an aqueous solution of 0.123 grams NH$_4$F in 24 grams water, drying the NH$_4$F-treated catalyst at about 120° C., impregnating the dried NH$_4$F-treated catalyst with the diluted aqueous dispersion of Sb$_2$O$_5$, described above for the preparation of Catalyst B, and drying the NH$_4$F/Sb$_2$O$_3$-impregnating catalyst at 120° C. Catalyst C contained 1250 ppm F and 1000 ppm Sb.

Catalyst D (Invention) was prepared in accordance with the procedure for Catalyst C, except that the aqueous NH$_4$F solution contained 0.243 grams NH$_4$F in 24 grams water. Catalyst D contained 2500 ppm F and 1000 ppm Sb.

Catalyst E (Invention) was prepared in accordance with the procedure for Catalyst C, except that the aqueous NH$_4$F solution contained 0.487 grams NH$_4$F in 24 grams water. Catalyst E contained 5000 ppm F and 1000 ppm Sb.

Example II

Catalysts A through E were then evaluated in a MCBU (micro-confined bed unit) cracking test reactor, substantially in accordance with the procedure of Example II of U.S. Pat. No. 4,794,095. Cracking test conditions comprised a temperature of about 950° F., a catalyst to oil weight ratio of 6:1, and the use of a hydrotreated residuum as oil feed having API gravity at 60° C. of 18.7, sulfur content of 0.53 weight-%, basic nitrogen content of 0.09 weight-%, Conradson carbon content of 6.7 weight-%, nickel content of 10.6 ppm (parts per million by weight) and vanadium content of 12.7 ppm. Test results are summarized in Table I.

TABLE I

| Run | Catalyst | Catalyst Treatment | Conversion (Wt % of Feed) | Gasoline Yield (Wt % of Converted Feed) | H$_2$ Generation (SCF/BL Converted Feed) |
|---|---|---|---|---|---|
| 1 | A | None | 80 | 52 | 226 |
| 2 | " | " | 78 | 51 | 234 |
| 3 | " | " | 79 | 51 | 247 |
| 4 | " | " | 78 | 51 | 236 |
|   |   | Average | 79 | 51 | 236 |
| 5 | B | A + Sb | 79 | 51 | 117 |
| 6 | " | " | 80 | 52 | 98 |
| 7 | " | " | 78 | 51 | 95 |
|   |   | Average | 79 | 51 | 103 |
| 8 | C | A + NH$_4$F + Sb | 81 | 52 | 102 |
| 9 | " | " | 81 | 52 | 93 |
| 10 | " | " | 82 | 51 | 121 |
|   |   | Average | 81 | 52 | 105 |
| 11 | D | A + NH$_4$F + Sb | 80 | 52 | 76 |
| 12 | " | " | 80 | 52 | 72 |
| 13 | " | " | 80 | 52 | 77 |
|   |   | Average | 80 | 52 | 75 |
| 14 | E | A + NH$_4$F + Sb | 82 | 52 | 97 |
| 15 | " | " | 81 | 52 | 75 |
| 16 | " | " | 81 | 53 | 82 |
|   |   | Average | 81 | 52 | 85 |

NOTE:
Coke yield was about 11-12 weight % all runs.

Test results in Table I clearly show that treatment of a partially demetallized spent catalyst (Catalyst A) with antimony alone caused a reduction in H$_2$ generation but did not result in any improvement of feed conversion and gasoline yield. By contrast, treatment of the partially demetallized catalyst with NH$_4$F, in addition to treatment with Sb$_2$O$_5$, resulted in higher conversion and higher gasoline yield. Also, at a high enough level of F, an even further reduction of H₂ generation (versus treatment with Sb alone) was attained.

Reasonable variations, modifications and adaptations for various usages and conditions can be made within the cope of the disclosure and the appended claims, without departing from the scope of this invention.

That which is claimed is:

1. In a process for reactivating a spent zeolite-containing catalytic cracking catalyst composition, which contains at least one metal contaminant, comprising contacting said spent catalytic cracking catalyst composition with (a) at least one fluorine compound selected from the group consisting of NH₄F, NH₄HF₂ and HF and (b) at least one metals passivating agent selected from the group consisting of antimony compounds, under such contacting conditions as to result in reduced hydrogen generation caused by said at least one metal contaminant contained in said spent catalytic cracking catalyst composition during catalytic cracking; the improvement which comprises employing, in said contacting with agents (a) and (b), a substantially coke-free, spent, metal-contaminated catalytic cracking catalyst composition which has previously been subjected to treatment with at least one chlorine-containing substance at an elevated temperature so as to obtain a chlorinated catalyst composition, followed by cooling the chlorinated catalyst composition, and washing the cooled, chlorinated catalyst composition with at least one aqueous liquid so as to reduce the content of said at least one metal contaminant in said substantially coke-free, spent, metal-contaminated catalytic cracking catalyst composition.

2. A process in accordance with claim 1, wherein said at least one metal contaminant in said spent cracking catalyst composition is selected from the group consisting of compounds of nickel, vanadium, iron and copper.

3. A process in accordance with claim 1, wherein agent (a) is an aqueous solution of NH₄F.

4. A process in accordance with claim 3, wherein said aqueous solution contains about 0.01 to about 2 mol/l NH₄F.

5. A process in accordance with claim 1, wherein agent (b) is a solution containing about 0.01 to about 0.5 mol/l Sb.

6. A process in accordance with claim 1, wherein said contacting is conducted at such conditions as to incorporate about 0.01 to about 2 weight-% F and about 0.01 to about 5 weight-% Sb into said spent Catalyst cracking catalyst composition.

7. A process in accordance with claim 1, wherein said at least one chlorine-containing substance is selected form the group consisting of carbon tetrachloride, sulfur monochloride, sulfur dichloride, thionyl chloride and sulfuryl chloride.

8. A process in accordance with claim 1, wherein said elevated temperature is about 300°–1000° F.

9. A process in accordance with claim 1, wherein prior to said treatment with said at least one chlorine-containing compound, said substantially coke-free, spent metal-contaminated catalytic cracking composition has been treated with a molecule oxygen-containing gas at a temperature of about 1000°–1800° F.

10. A process in accordance with claim 1, wherein said substantially coke-free, spent metal-contaminated catalytic cracking catalyst composition has been treated with a molecular oxygen-containing gas at a temperature of about 1000°–1800° F., and thereafter with a sulfiding agent selected from the group consisting of elemental sulfur vapors, hydrogen sulfide, carbon disulfide and mercaptans at a temperature of about 500°–1500° F.

11. A process in accordance with claim 1, wherein said washing of said cooled, chlorinated catalyst composition is first carried out with an aqueous solution of a reducing agent and thereafter with an aqueous solution of an oxidizing agent.

12. A process in accordance with claim 11, wherein said reducing agent is sulfur dioxide, and said oxidizing agent is hydrogen peroxide.

13. A process in accordance with claim 2, wherein said at least one metal contaminant in said spent cracking catalyst composition is present at a level of about 0.01 weight-% to about 2.0 weight-%, expressed as metal oxide.

14. A process in accordance with claim 5, wherein said solution contains at least one antimony compound selected from the group consisting of antimony tris (O,O-dihydrocarbyl) phosphorodithioates, antimony oxides, antimony carboxylates and antimony mercaptides.

15. A process in accordance with claim 1, wherein said contacting is carried out at a temperature of about 10° to about 100° C. for about 0.1 to about 10 hours.

16. A process in accordance with claim 1, comprising the additional step, after said contacting with agents (a) and (b), of heating the thus-contacted spent catalytic cracking catalyst composition so as to substantially dry the thus-contacted spent catalytic cracking catalyst composition.

* * * * *